(12) United States Patent
Suzuki

(10) Patent No.: US 10,360,929 B2
(45) Date of Patent: Jul. 23, 2019

(54) DISK DEVICE WITH FIRST AND SECOND COVER SEALING STRUCTURE

(71) Applicants: Kabushiki Kaisha Toshiba, Minato-ku, Tokyo (JP); Toshiba Electronic Devices & Storage Corporation, Minato-ku, Tokyo (JP)

(72) Inventor: Yasuo Suzuki, Fujisawa Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 15/907,863

(22) Filed: Feb. 28, 2018

(65) Prior Publication Data

US 2019/0066716 A1 Feb. 28, 2019

(30) Foreign Application Priority Data

Aug. 23, 2017 (JP) ................... 2017-160474

(51) Int. Cl.
*G11B 5/10* (2006.01)
*G11B 33/14* (2006.01)

(52) U.S. Cl.
CPC ............ *G11B 5/10* (2013.01); *G11B 33/1466* (2013.01); *G11B 33/1486* (2013.01)

(58) Field of Classification Search
CPC .... G11B 5/10; G11B 33/1466; G11B 33/1486
See application file for complete search history.

(56) References Cited

U.S. PATENT DOCUMENTS

| | | | |
|---|---|---|---|
| 6,317,286 B1 | 11/2001 | Murphy et al. | |
| 6,560,064 B1 * | 5/2003 | Hirano | G11B 33/1413 360/69 |
| 6,683,747 B2 * | 1/2004 | Bernett | G11B 25/043 360/97.22 |
| 7,420,773 B2 * | 9/2008 | Hatanaka | G11B 33/1486 360/97.13 |
| 8,248,724 B2 * | 8/2012 | Hayakawa | G11B 33/1486 360/97.12 |
| 8,659,849 B2 | 2/2014 | Hayakawa et al. | |
| 8,797,676 B2 * | 8/2014 | Maeda | G11B 33/08 360/97.12 |
| 9,001,458 B1 * | 4/2015 | Vitikkate | G11B 25/043 360/97.22 |
| 9,183,889 B1 | 11/2015 | Smyth et al. | |
| 9,293,169 B2 * | 3/2016 | Andrikowich | G11B 33/1486 |
| 9,916,872 B1 * | 3/2018 | Amin-Shahidi | G11B 33/1466 |
| 2012/0176701 A1 * | 7/2012 | Schreck | G11B 25/043 360/97.22 |

FOREIGN PATENT DOCUMENTS

| | | |
|---|---|---|
| EP | 1114116 A1 | 2/2011 |
| JP | 2000-331458 A | 11/2000 |

* cited by examiner

*Primary Examiner* — Brian E Miller
(74) *Attorney, Agent, or Firm* — White & Case LLP

(57) ABSTRACT

According to one embodiment, a disk device includes a rotatable recording medium, a head, and a housing which includes a first enclosed space accommodating the recording medium and the head, and a second enclosed space defined between the first enclosed space and outside air. Low-density gas is sealed in each of the first enclosed space and the second enclosed space, and a pressure of the first enclosed space is different from that of the second enclosed space.

8 Claims, 5 Drawing Sheets

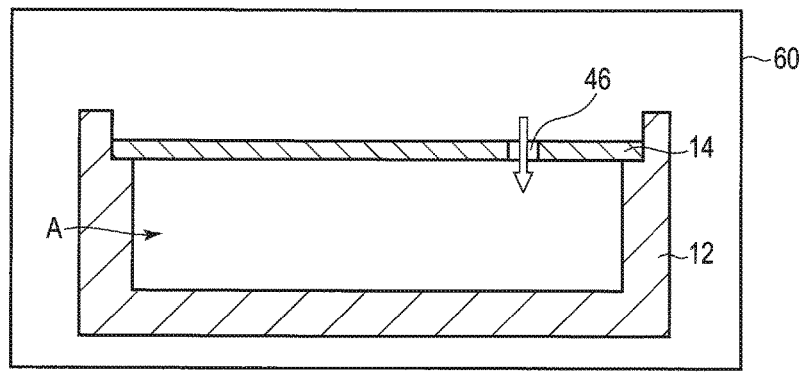
F I G. 4A
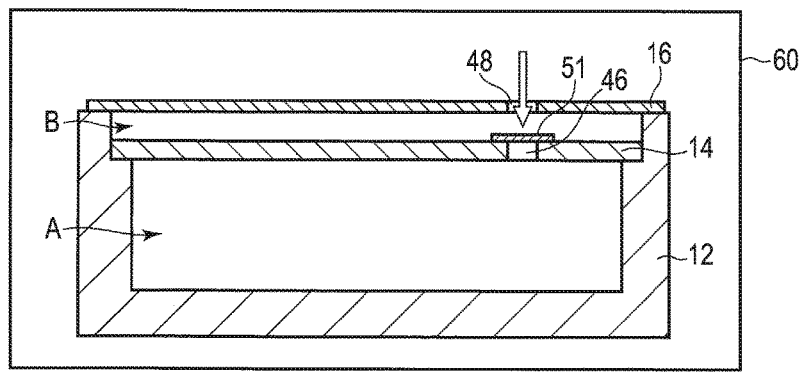
F I G. 4B
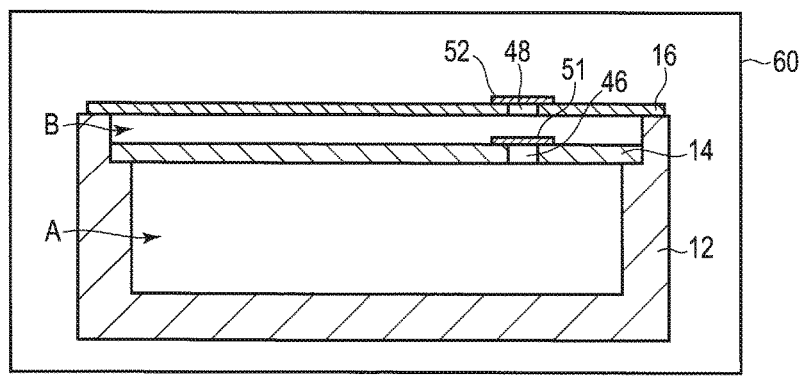
F I G. 4C

DISK DEVICE WITH FIRST AND SECOND COVER SEALING STRUCTURE

CROSS-REFERENCE TO RELATED APPLICATIONS

This application is based upon and claims the benefit of priority from Japanese Patent Application No. 2017-160474, filed Aug. 23, 2017, the entire contents of which are incorporated herein by reference.

FIELD

Embodiments described herein relate generally to a disk device.

BACKGROUND

As a disk device, a magnetic disk drive comprises a housing including a base and an outer cover, and a rotatable magnetic disk and an actuator supporting a magnetic head are provided in the housing. As a method of improving the performance of the disk drive, a method of reducing airflow disturbance that affects the magnetic disk and the magnetic head, by sealing low-density gas such as helium in the housing, has been proposed.

In such a magnetic disk drive, by structuring the housing to be hermetically closed by laser welding the outer cover to the base of the housing, airtightness of the housing is increased. The laser welding is performed along the entire outer periphery of the outer cover. When a pressure in the housing is different from a pressure of the use environment of the magnetic disk drive, the outer cover, for example, may be deformed.

BRIEF DESCRIPTION OF THE DRAWINGS

FIG. 4A is a cross-sectional view of the housing and a chamber, showing the state in which low-density gas is sealed in the housing.

FIG. 4B is a cross-sectional view of the housing and a chamber, showing the state in which first and second covers are fixed to a base.

FIG. 4C is a cross-sectional view of the housing and a chamber, showing the state in which low-density gas is sealed in the housing.

DETAILED DESCRIPTION

Figure 1:
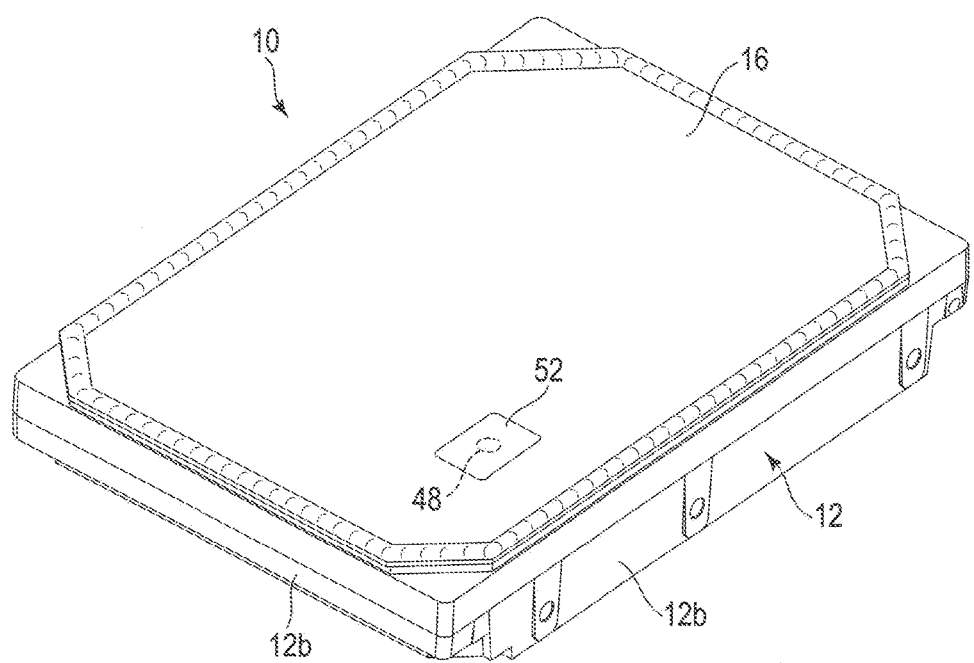
FIG. 1 is a perspective view showing the appearance of a hard disk drive (HDD) according to a first embodiment.

Various embodiments will be described hereinafter with reference to the accompanying drawings. In general, according to one embodiment, a disk device comprises: a disk-shaped recording medium which is rotatable; a head which processes data with respect to the recording medium; and a housing including a first enclosed space accommodating the recording medium and the head, and a second enclosed space defined between the first enclosed space and outside air. Low-density gas is sealed in each of the first enclosed space and the second enclosed space, and a pressure of the first enclosed space is different from that of the second enclosed space.

Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless otherwise necessary.

First Embodiment

Figure 2:
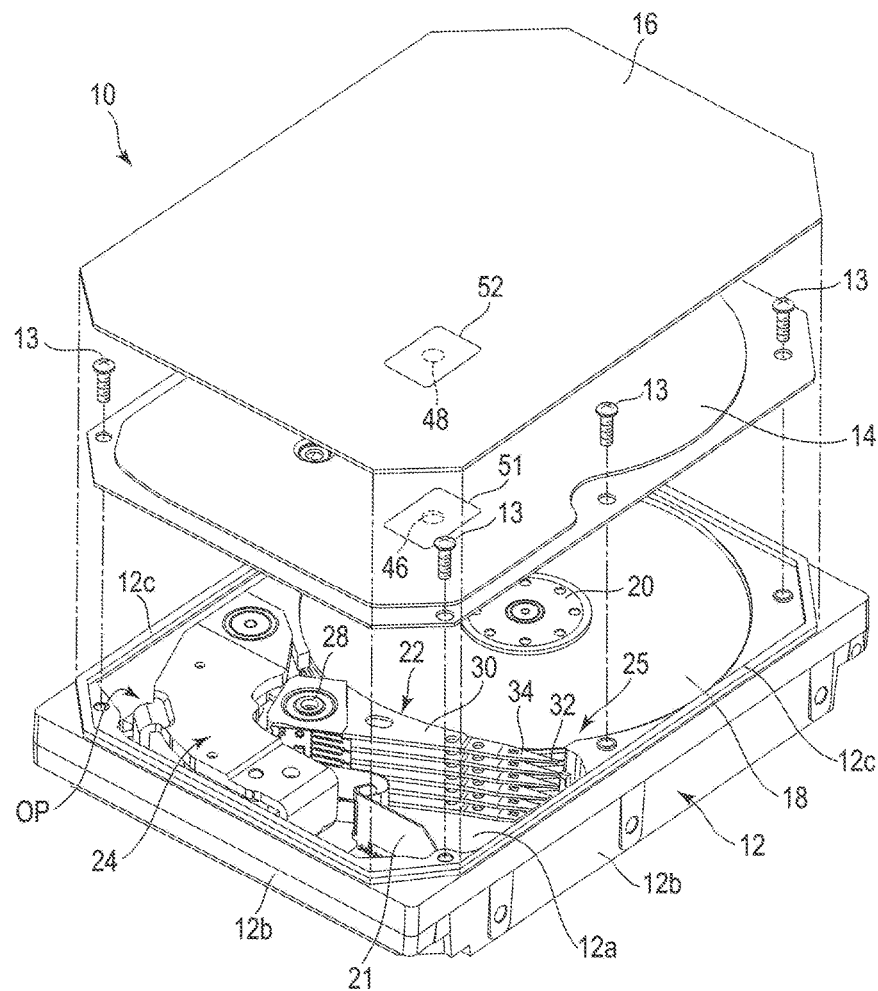
FIG. 2 is an exploded perspective view showing an internal structure of the HDD.

FIG. 1 is a perspective view showing the appearance of an HDD according to a first embodiment, and FIG. 2 is an exploded perspective view showing an internal structure of the HDD.

As shown in FIGS. 1 and 2, the HDD comprises a substantially rectangular housing 10. The housing 10 comprises a base 22 in the shape of a rectangular box whose upper surface is open, an inner cover (a first cover) 14 which is secured to the base 12 by a plurality of screws 13 and closes an upper end opening OP of the base 12, and an outer cover (a second cover) 16 which is arranged over the inner cover 14, and whose peripheral edge portion is welded to the base 12. The base 12 comprises a rectangular bottom wall 12a which is opposed to the inner cover 14 with a gap, and sidewalls 12b standing along edges of the bottom wall 12a, and the bottom wall 12a is formed integrally with the sidewalls 12b. The sidewalls 12b include a pair of long walls that are opposed to each other and pair of short walls that are opposed to each other. A substantially rectangular frame-shaped fixing rib 12c is provided in a protruding manner on an upper end surface of the sidewalls 12b.

The inner cover 24 is formed in the shape of a rectangular plate. A peripheral edge portion of the inner cover 14 is screwed to an upper surface of each of the sidewalls 12b of the base 12 by the screws 13, and the inner cover 14 is fixed to an inner side of the fixing rib 12c. The outer cover 16 is formed in the shape of a rectangular plate. The outer cover 16 is slightly larger than the inner cover 14 in planar dimension. A peripheral edge portion of the outer cover 16 is welded to the fixing rib 12c of the base 12 all around the outer cover 16, and is fixed to be airtight.

In the inner cover 14 and the outer cover 16, vent holes 46 and 48 through which the interior of the housing 10 and the exterior of the housing 10 communicate with each other are formed, respectively. Low-density gas whose density is lower than that of air, more specifically, inactive gas such as helium, is sealed in the housing 10. A sealant (a sealing body, e.g., rectangular seal, sealing tape of metal) 51 is attached to an outer surface of the inner cover 14 so as to close the vent hole 46. Also, a sealant (a sealing body) 52 is attached to an outer surface of the outer cover 16 so as to close the vent hole 48.

As shown in FIG. 2, in the housing 10, a plurality of magnetic disks 18 as recording media, and a spindle motor 20 as a drive unit which supports and rotates the magnetic disks 18 are provided. The spindle motor 20 is provided on the bottom wall 12a. Each of the magnetic disks 18 includes a magnetic recording layer on its upper surface or lower surface. Each of the magnetic disks 18 is fitted coaxially on a hub (not shown) of the spindle motor 20, and is clamped by a clamp spring, so that the magnetic disk 18 is secured to the hub. In this way, each of the magnetic disks 18 is supported parallel to the bottom wall 12a of the base 12. The magnetic disks 18 are rotated at a predetermined number of revolutions by the spindle motor 20.

As shown in FIG. 2, five magnetic disks 18, for example, are accommodated in the housing 10 in the present embodiment. However, the number of magnetic disks 18 is not limited to the above. Further, a single magnetic disk 18 may be accommodated in the housing 10.

In the housing 10, a plurality of magnetic heads 32, which record and reproduce information on and from the magnetic disks 18, and a head stack assembly (actuator) 22, which supports the magnetic heads 32 such that they are movable with respect to the magnetic disks 18, are provided. Further, the housing 10 accommodates a voice coil motor (hereinafter referred to as VCM) 24 which rotates and positions the head stack assembly 22, a ramp loading mechanism 25 which holds the magnetic heads 32 at an unloading position away from the magnetic disks 18 when the magnetic heads 32 are moved to the outermost circumference of the magnetic disks 18, and a board unit 21 on which electronic components such as a conversion connector are mounted. The board unit 21 is constituted by a flexible printed circuit (FPC), and the FPC is electrically connected to the magnetic heads 32 and a voice coil of the VCM 24 via a relay FPC on the head stack assembly 22.

The head stack assembly 22 comprises a rotatable bearing unit 28, a plurality of arms 30 extending from the bearing unit 28, and suspensions 34 extending from the respective arms 30, and the magnetic heads 32 are supported on distal end portions of the respective suspensions 34.

A control circuit board, not shown, is screwed to an outer surface of the bottom wall 12a of the base 12. The control circuit board controls the operation of the spindle motor 20, and also controls the operation of the WM 24 and the magnetic heads 32 via the board unit 21.

Figure 3:
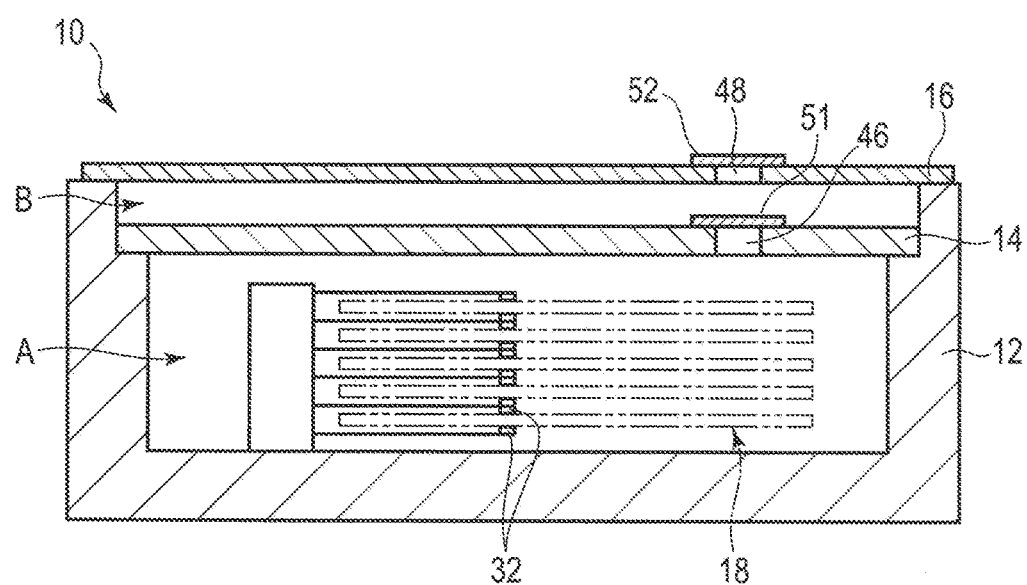
FIG. 3 is a cross-sectional view schematically showing a housing.

FIG. 3 is a cross-sectional view which schematically shows the housing 10. The outer cover 16 is normally formed of a thin material. In the following, a space between the base 12 and the inner cover 14 is referred to as space A, and a space between the inner cover 14 and the outer cover 16 is referred to as space B. In space A, the magnetic disks 18, the magnetic heads 32, etc., are accommodated.

Space (first enclosed space) A is hermetically closed as the inner cover 14 is screwed to the upper surface of the base 12, and the vent hole (first vent hole) 46 is sealed by the sealant (first sealant) 51, as described above. Note that a sealing member such as a gasket should preferably be interposed between the inner cover 14 and the base 12, in order to increase airtightness, though this is not illustrated in the drawing. Space (second enclosed space) B is hermetically closed as the outer cover 16 is welded to the base 12, and the vent hole (second vent hole) 48 is sealed by the sealant (second sealant) 52, as described above.

Low-density gas is sealed in each of space A and space B at an arbitrary pressure. In the present embodiment, a pressure of the low-density gas sealed in space A (hereinafter referred to as a pressure of space A) is different from that of the low-density gas sealed in space B (hereinafter referred to as a pressure of space B). More specifically, the pressure of space A is kept to an arbitrary pressure at which the magnetic head 32 can fly, that is, a pressure at which the magnetic head 32 flies and a distance between the magnetic head 32 and the magnetic disk 18 is increased to a predetermined value. Meanwhile, the pressure of space B is set lower than an outside pressure of the HDD.

According to the present embodiment, space A and space B are hermetically closed independently, and are kept at different pressures. The pressure of space B is lower than the outside pressure of the HDD. Accordingly, even if the outer cover 16 is sufficiently thin, it is possible to prevent such a deformation that the outer cover 16 is expanded outwardly with respect to the HOD, which is caused by a difference between the pressure of space B and the outside pressure of the HOD.

FIGS. 4A, 4B, and 4C are cross-sectional views of the housing, showing processes of sealing the low-density gas in the housing 10. Here, only the elements necessary for explanation are shown, and illustration of the magnetic disks, etc., is omitted.

As shown in FIG. 4A, the base 12 to which the inner cover 14 is screwed is placed in a chamber 60, and the chamber 60 is decompressed. Air in space A is thereby discharged through the vent hole 46 communicating with space A. Next, through the vent hole 46, low-density gas such as helium is sealed in space A. Then, as shown in FIG. 4B, the vent hole 46 is sealed by the sealant 51. In this way, space A is hermetically closed while a predetermined pressure is being maintained. Next, the outer cover 16 is welded to the base 12. After the chamber 60 is decompressed as necessary, low-density gas such as helium is sealed in space B, through the vent hole 48 communicating with space B. After that, as shown in FIG. 40, the vent hole 48 is sealed by the sealant 52. In this way, space B is hermetically closed while a predetermined pressure is being maintained.

According to the HDD of the first embodiment structured as above, by providing space A and space B which are hermetically closed independently in the housing, it is possible to arbitrarily set the pressures of space A and space B, respectively. By sealing the low-density gas in space A, and setting the pressure of space A to that at which the magnetic head can fly, airflow disturbance that affects the magnetic disks and the magnetic heads can be reduced, and higher recording density can be realized. Also, since there is no need to consider flying performance of the magnetic head in space B, the pressure of space B can be adjusted to an arbitrary pressure. For example, by setting the pressure of space B to be lower than the outside pressure of the HDD, it is possible to prevent such a deformation that the outer cover 16 is expanded outwardly with respect to the HDD, which is caused by a difference between the pressure of space B and the outside pressure of the HDD.

In view of the foregoing, according to the first embodiment, a disk device capable of suppressing deformation of a housing while further increasing recording density cart be obtained.

Second Embodiment

Figure 5:
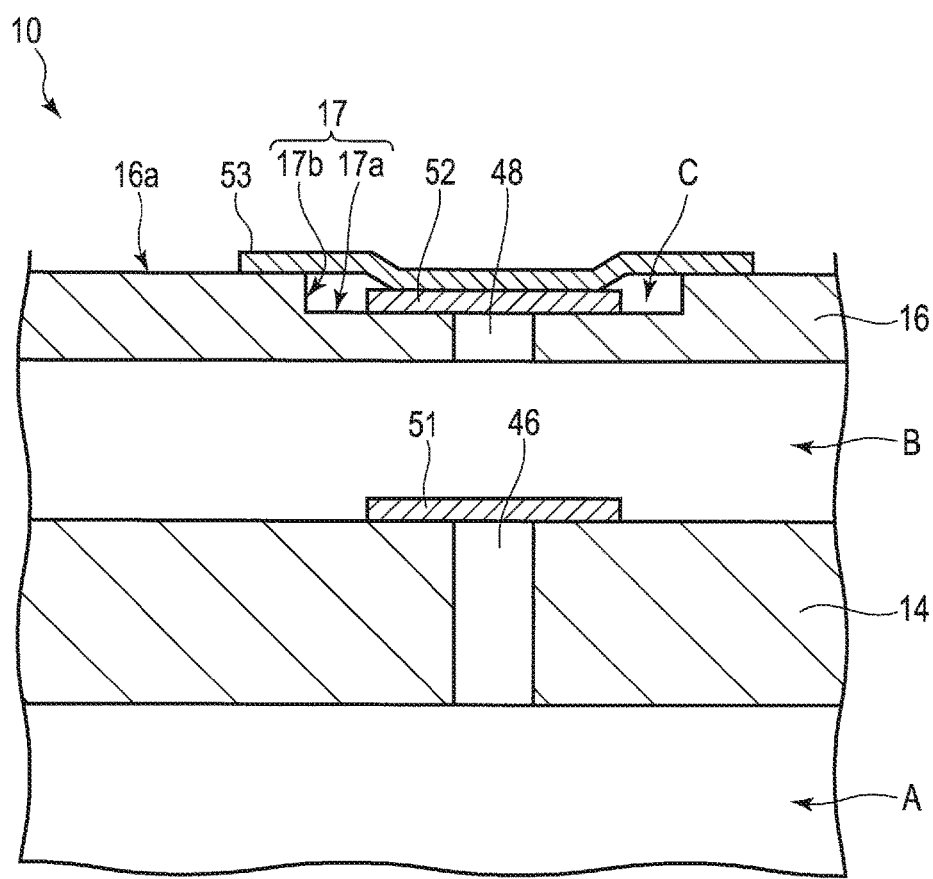
FIG. 5 is a cross-sectional view showing a part near an vent hole of an HDD according to a second embodiment in an enlarged scale.

FIG. 5 is a cross-sectional view showing a part of the housing, near an vent hole 48 of an HDD according to a second embodiment in an enlarged scale. The second embodiment is different from the first embodiment in that a sealant (a third sealant) 53 is provided on a sealant 52.

An outer cover 16 of the housing includes a recess 17 formed on an upper surface (outer surface) 16a of the outer cover 16. The recess 17 is provided to overlap the vent hole 48. The vent hole 48 opens to a bottom surface 17a of the recess 17. The sealant 52 is located within the recess 17 entirely. The sealant 52 is attached to the bottom surface 17*a*, and seals the vent hole 48. The sealant 53 is attached to the upper surface 16*a*, and covers the entirety; of the recess 17. In the recess 17, a part of the sealant 53 is attached to the sealant 52. In the example illustrated, around the sealant 52, the sealant 53 is spaced apart from the bottom surface 17*a* and a side surface 17*b*. In the following, a space between the sealant 53 and the outer cover 16, more specifically, a space surrounded by the sealant 53, the sealant 52, the bottom surface 17*a*, and the side surface 17*b*, is referred to as space (a third space) C. Low-density gas such as helium is sealed in space C, and this space is hermetically closed.

In the present embodiment, a pressure of space C is different from that of space A. As described above, the pressure of space A is kept to a pressure which allows a magnetic head 32 to fly at a predetermined height. Meanwhile, the pressure of space C is set lower than the outside pressure of the HDD. In one example, the pressure of space C is equal to that of space B, but may be different.

In the second embodiment, the other structures of the HDD are the same as those of the HDD according to the first embodiment described above.

According to the present embodiment, by doubly sealing the vent hole 48 of the outer cover 16 with the sealant 52 and the sealant 53, airtightness of space B can be improved. At this time, even if space C is formed between the outer cover 16 and the sealant 53, by setting the pressure of space C to be lower than the outside pressure of the HDD, it is possible to suppress such a deformation that the sealant 53 is expanded. Accordingly, it is possible to prevent the sealant 53 from being peeled off, and a high level of airtightness can be maintained. In view of the foregoing, also in the second embodiment, a disk device capable of preventing deformation of a housing while further increasing recording density can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the low-density gas is not limited to helium, and the other low-density gas can be selected. The materials, shapes, sizes, etc., of elements which constitute the disk device are not limited to those in the above-described embodiments, and can be changed variously as needed.

What is claimed is:

1. A disk device comprising:
a disk-shaped recording medium which is rotatable;
a head which processes data with respect to the recording medium; and
a housing comprising a base, a first cover joined to the base, a first enclosed space defined between the first cover and the base and accommodating the recording medium and the head, a second cover which is arranged over the first cover and joined to the base, and a second enclosed space defined between the second cover and the first cover, wherein
low-density gas is sealed in each of the first enclosed space and the second enclosed space, and a pressure of the first enclosed space is different from that of the second enclosed space.

2. The disk device of claim 1, wherein the pressure of the second enclosed space is lower than that of the first enclosed space.

3. The disk device of claim 1, wherein:
the first cover includes a first vent hole communicating with the first enclosed space; and
the second cover includes a second vent hole communicating with the second enclosed space, and
the disk device further comprises:
a first sealant which closes the first vent hole; and a second sealant which closes the second vent hole.

4. The disk device of claim 3, further comprising a third sealant which is attached to the second cover and overlaps with the second sealant, wherein:
low-density gas is sealed in a third enclosed space defined by the second cover, the second sealant, and the third sealant; and
a pressure of the third enclosed space is different from that of the first enclosed space.

5. The disk device of claim 4, wherein the pressure of the third enclosed space is lower than that of the first enclosed space.

6. A disk device comprising:
a disk-shaped recording medium which is rotatable;
a head which processes data with respect to the recording medium; and
a housing including a first enclosed space and a second enclosed space, and accommodating the recording medium and the head, wherein
low-density gas is sealed in each of the first enclosed space and the second enclosed space, and a pressure of the first enclosed space is different from that of the second enclosed space, and
the housing comprises a base which accommodates the recording medium and the head, a first cover which is joined to the base and defines the first enclosed space between the first cover and the base, and a second cover which is arranged over the first cover and joined to the base, the second enclosed space being defined between the second cover and the first cover.

7. The disk device of claim 6, wherein:
the first cover includes a first vent hole communicating with the first enclosed space; and
the second cover includes a second vent hole communicating with the second enclosed space, and
the disk device further comprises:
a first sealant which closes the first vent hole and defines the first enclosed space; and
a second sealant which closes the second vent hole and defines the second enclosed space.

8. A disk device comprising:
a disk-shaped recording medium which is rotatable;
a head which processes data with respect to the recording medium; and
a housing including a first enclosed space and a second enclosed space, and accommodating the recording medium and the head, wherein
low-density gas is sealed in each of the first enclosed space and the second enclosed space, and a pressure of the first enclosed space is different from that of the second enclosed space, and
the housing comprises a base which accommodates the recording medium and the head, and a second cover which is joined to the base, defines the first enclosed space between the second cover and the base, and includes a second vent hole communicating with the first enclosed space, and the disk device further comprises:

a second sealant which is attached to the second cover and closes the second vent hole; and a third sealant which is attached the second cover on top of the second sealant, and defines the second enclosed space with the second cover and the second sealant.

* * * * *